(12) United States Patent
McCaffrey

(10) Patent No.: US 10,107,109 B2
(45) Date of Patent: Oct. 23, 2018

(54) GAS TURBINE ENGINE COMPONENT COOLING ASSEMBLY

(71) Applicant: United Technologies Corporation, Farmington, CT (US)

(72) Inventor: Michael G. McCaffrey, Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 361 days.

(21) Appl. No.: 14/965,227

(22) Filed: Dec. 10, 2015

(65) Prior Publication Data

US 2017/0167271 A1 Jun. 15, 2017

(51) Int. Cl.
  *F01D 5/18* (2006.01)
  *F01D 25/24* (2006.01)

(52) U.S. Cl.
  CPC ............. *F01D 5/187* (2013.01); *F01D 25/24* (2013.01); *F05D 2220/32* (2013.01); *F05D 2260/202* (2013.01)

(58) Field of Classification Search
  CPC .......... F01D 5/081; F01D 5/187; F01D 25/24; F05D 2220/32; F05D 2240/303; F05D 2260/14; F05D 2260/202
  See application file for complete search history.

(56) References Cited

U.S. PATENT DOCUMENTS

| | | |
|---|---|---|
| 2,951,340 A | 9/1960 | Howald |
| 3,814,539 A | 6/1974 | Klompas |
| 3,826,084 A * | 7/1974 | Branstrom ............. F01D 5/081 415/115 |
| 3,989,410 A | 11/1976 | Ferrari |
| 4,236,869 A | 12/1980 | Laurello |
| 4,236,870 A * | 12/1980 | Hucul, Jr. ............... F01D 5/187 415/115 |
| 4,247,257 A | 1/1981 | Benoist et al. |
| 4,348,157 A | 9/1982 | Campbell et al. |
| 4,416,111 A * | 11/1983 | Lenahan ................... F02C 7/18 415/115 |
| 4,732,538 A | 3/1988 | Wollenweber et al. |
| 4,807,433 A * | 2/1989 | Maclin ..................... F01D 5/081 415/115 |
| 4,882,902 A * | 11/1989 | Reigel ..................... F01D 5/082 415/115 |
| 5,311,734 A | 5/1994 | Pope et al. |
| 6,077,035 A | 6/2000 | Walters et al. |

(Continued)

FOREIGN PATENT DOCUMENTS

EP 2055895 5/2009

OTHER PUBLICATIONS

European Search Report for European Patent Application No. 16202518.3 dated Apr. 6, 2017.

*Primary Examiner* — Igor Kershteyn

(74) *Attorney, Agent, or Firm* — Carlson, Gaskey & Olds, P.C.

(57) ABSTRACT

A rotor blade assembly includes at least one rotor blade including an airfoil that has a leading edge internal cooling passage that extends through the rotor blade and is in communication with cooling holes along a leading edge of the airfoil. A compression portion includes a compression passage that is in communication with the leading edge internal cooling passage.

20 Claims, 6 Drawing Sheets

(56) References Cited

U.S. PATENT DOCUMENTS

| | | | |
|---|---|---|---|
| 6,468,032 B2 * | 10/2002 | Patel | F01D 5/081 |
| | | | 415/115 |
| 6,735,956 B2 | 5/2004 | Romani | |
| 7,458,766 B2 * | 12/2008 | Dailey | F01D 5/082 |
| | | | 415/1 |
| 8,047,787 B1 | 11/2011 | Liang | |
| 8,935,926 B2 * | 1/2015 | Wagner | F02C 6/08 |
| | | | 415/104 |
| 2009/0110561 A1 * | 4/2009 | Ramerth | F01D 5/082 |
| | | | 416/96 R |
| 2014/0112798 A1 | 4/2014 | Justl et al. | |

* cited by examiner

GAS TURBINE ENGINE COMPONENT COOLING ASSEMBLY

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

The turbine section includes at least one array of vanes axially offset from at least one array of blades. In order to increase operating efficiency of the gas turbine engine, operating temperatures in the turbine section have typically been increased. The elevated temperature of the turbine section requires cooling of several of the components in the turbine section with air from the compressor section. However, to meet the increased temperature demands in a gas turbine engine, the additional cooling that is required will increase the demand on the compressor section, which supplies the cooling fluid, reducing the overall efficiency of the gas turbine engine.

In one exemplary embodiment, a rotor blade assembly includes at least one rotor blade including an airfoil that has a leading edge internal cooling passage that extends through the rotor blade and is in communication with cooling holes along a leading edge of the airfoil. A compression portion includes a compression passage that is in communication with the leading edge internal cooling passage.

In a further embodiment of the above, at least one rotor blade includes a trialing edge internal cooling passage.

In a further embodiment of any of the above, the compression passage includes an inlet that has a first cross-sectional area and an outlet that has a second cross-sectional area smaller than the first cross sectional area.

In a further embodiment of any of the above, the leading edge internal cooling passage includes an aerodynamic shape.

In a further embodiment of any of the above, the aerodynamic shape tapers in a radially outward direction.

In a further embodiment of any of the above, the compression portion includes a compressor wheel forming a ring.

In a further embodiment of any of the above, the compression portion is integral with at least one rotor blade and includes a scoop.

In a further embodiment of any of the above, the leading edge internal cooling passage is configured to receive cooling air from an intermediate stage of a compressor section to provide bleed air to the leading edge internal cooling passage.

In another exemplary embodiment, a gas turbine engine assembly includes a compressor section for providing a bleed air source. A rotor blade assembly includes at least one rotor blade that includes an airfoil that has a leading edge internal cooling passage that extends through the rotor blade and is in communication with cooling holes along a leading edge of the airfoil. A compression portion includes a compression passage that is in communication with the leading edge internal cooling passage and the bleed air source.

In a further embodiment of any of the above, the bleed air source is from an intermediate stage of the compressor section.

In a further embodiment of any of the above, the compressor section includes a high pressure compressor and the intermediate stage is located in the high pressure compressor.

In a further embodiment of any of the above, the rotor blade includes a trialing edge internal cooling passage.

In a further embodiment of any of the above, the compression passage includes an inlet having a first cross-sectional area and an outlet having a second cross-sectional area smaller than the first cross sectional area.

In a further embodiment of any of the above, the leading edge internal cooling passage includes an aerodynamic shape.

In a further embodiment of any of the above, the aerodynamic shape tapers in a radially outward direction.

In a further embodiment of any of the above, the compression portion includes a compressor wheel forming a ring.

In a further embodiment of any of the above, the compression portion is integral with the at least one rotor blade and includes a scoop.

In another exemplary embodiment, a method of cooling a rotor blade includes directing bleed air from a compressor section into a rotor cavity. A first portion of the bleed air at a first pressure is directed into a compression portion for increasing a pressure of the bleed air entering a leading edge internal cooling passage of at least one rotor blade to a second pressure. A second portion of the bleed air at the first pressure is directed into a trailing edge internal cooling passage.

In a further embodiment of any of the above, the method includes rotating the compression portion with the at least one rotor blade.

In a further embodiment of any of the above, the method includes extracting the bleed air from an intermediate stage of a high pressure compressor in the compressor section.

DETAILED DESCRIPTION

Figure 1:
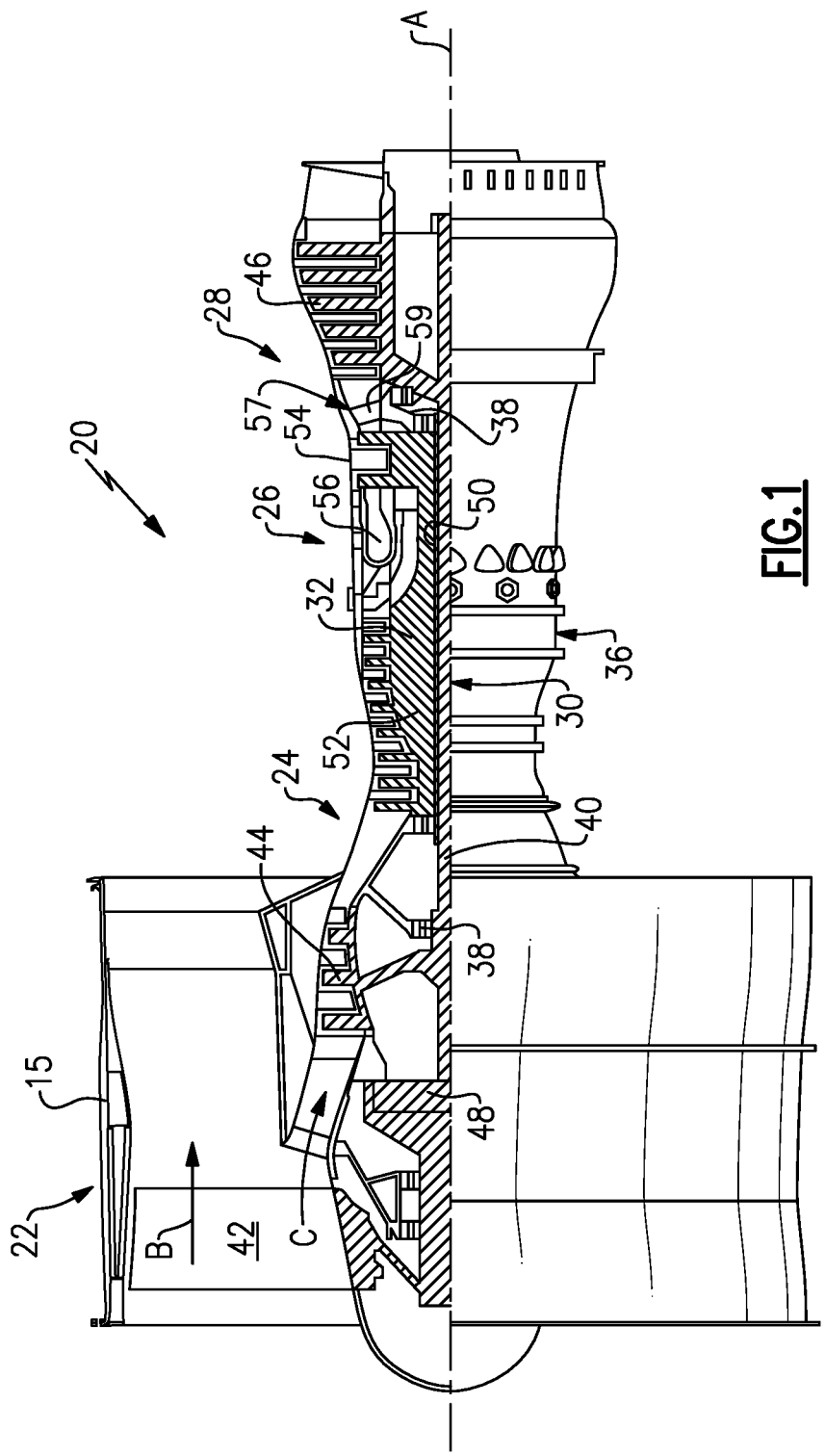
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second (350.5 meters/second).

The example gas turbine engine includes fan 42 that comprises in one non-limiting embodiment less than about twenty-six (26) fan blades. In another non-limiting embodiment, fan section 22 includes less than about twenty (20) fan blades. Moreover, in one disclosed embodiment low pressure turbine 46 includes no more than about six (6) turbine rotors. In another non-limiting example embodiment low pressure turbine 46 includes about three (3) turbine rotors. A ratio between number of fan blades 42 and the number of low pressure turbine rotors is between about 3.3 and about 8.6. The example low pressure turbine 46 provides the driving power to rotate fan section 22 and therefore the relationship between the number of turbine rotors 34 in low pressure turbine 46 and number of blades 42 in fan section 22 disclose an example gas turbine engine 20 with increased power transfer efficiency.

Figure 2:
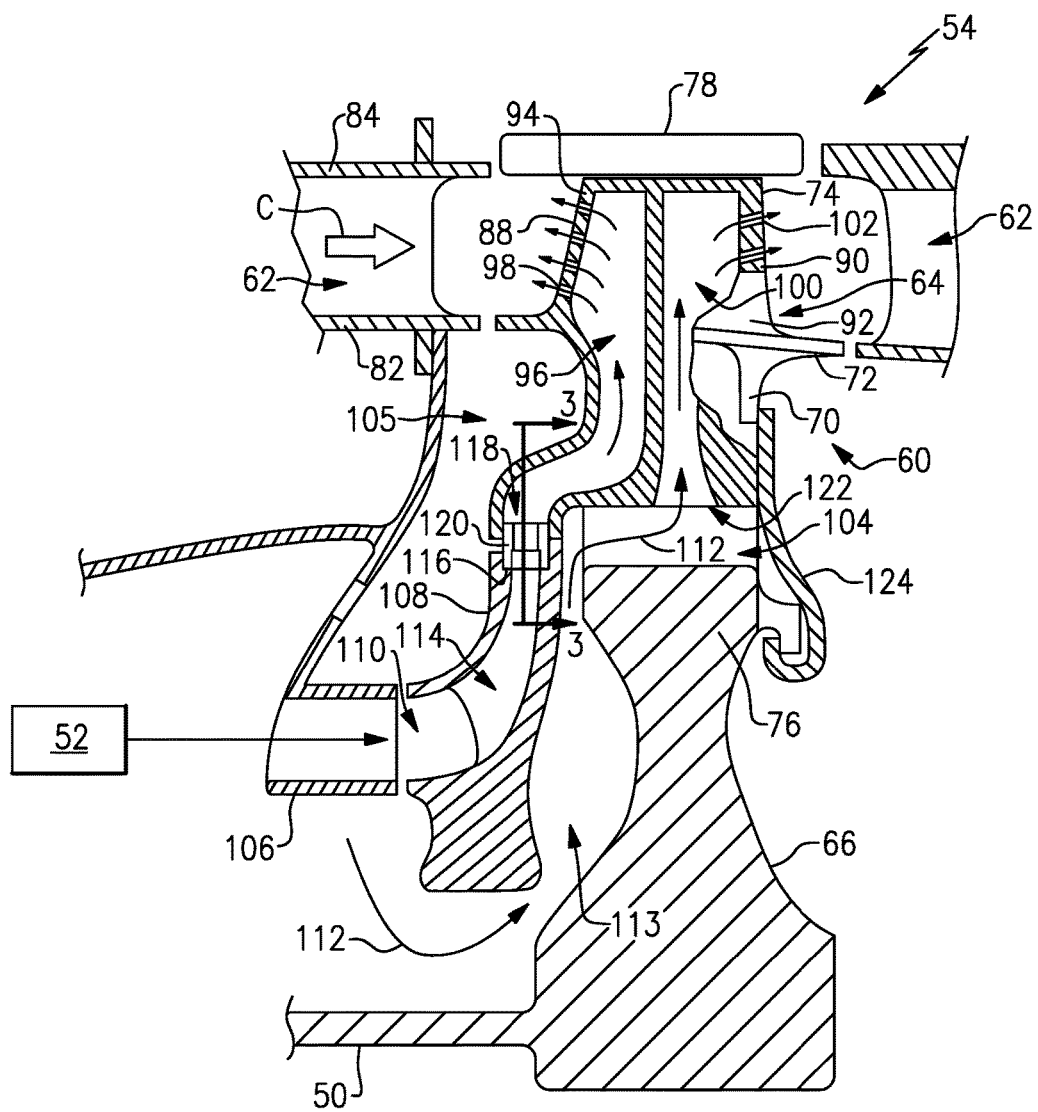
FIG. 2 is an enlarged schematic view of a high pressure turbine of the gas turbine engine of FIG. 1.

FIG. 2 illustrates an enlarged schematic view of the high pressure turbine 54, however, other sections of the gas turbine engine 20 could benefit from this disclosure. The high pressure turbine 54 generally includes a one-stage turbine section. However, this disclose also applies to a two (or more) stage turbine section. A rotor assembly 60 is attached to and rotates with the outer shaft 50.

The rotor assembly 60 includes an array of rotor blades 64 circumferentially spaced around a rotor disk 66. Each of the array of rotor blades 64 includes a respective root portion 70, a platform 72, and an airfoil 74. Each of the root portions 70 is received within a respective rim 76 of the rotor disk 66. The airfoil 74 extends radially outward toward a blade outer air seal (BOAS) assembly 78. In this disclosure, radial or radially and circumference or circumferentially are in relation to the engine axis A of the gas turbine engine 20 unless stated otherwise.

The rotor blades 64 are disposed in a core flow path C. The core flow path C was pressurized in the compressor section 24 then heated in the combustor section 26. The platform 72 separates the hot gas path airflow side inclusive of the array of rotor blades 64 from a non-gas path side inclusive of the root portion 70 of the rotor blade 64.

The array of vanes 62 extend between a respective inner vane platform 82 and an outer vane platform 84 to direct the core flow path past the array of vanes 62. The array of vanes 62 may be supported by the engine static structure 36.

Each of the rotor blades 64 includes a leading edge 88, a trailing edge 90, a pressure side 92, and a suction side 94. A leading edge internal cooling passage 96 extends along the leading edge 88 of each of the rotor blades 64 to supply cooling fluid to leading edge cooling holes 98 along the leading edge 88 of the rotor blade 64. A trailing edge internal cooling passage 100 extends along the trailing edge 90 of the of each of the rotor blades 64 to supply cooling fluid to trailing edge cooling holes 102 along the trailed edge 90 of the rotor blade 64.

Cooling air is provided to the leading and trailing internal cooling passages 96, 100 from bleed air 112 from the high pressure compressor 52 in the compressor section 24. It is desirable to reduce the amount of bleed air 112 from the compressor section 24 because the work expelled to compress the bleed air 112 does not contribute towards combustion in the gas turbine engine 20. Therefore, reducing the amount of bleed air 112 required from the compressor section 24 will increase the efficiency of the gas turbine engine 20.

In order to reduce the losses in efficiency caused from utilizing bleed air from the compressor section 24, the bleed air 112 is extracted at a lower pressure from an intermediate stage in the high pressure compressor 52 to the leading and trailing edge internal cooling passages 96, 100. By bleeding the compressed air off at an intermediate stage, or a stage upstream from the last stage of the high pressure compressor 52, less work from the compressor section 24 is being used for purposes other than combustion. Additionally, by utilizing bleed air 112 from one of the intermediate stages in the high pressure compressor 52, the temperature of the bleed air 112 is at a lower temperature than at outlet downstream stage of the high pressure compressor 52. The lower temperature of the bleed air 112 will more effectively cool the rotor blade 64.

In the illustrated embodiment, the high pressure turbine 54 is a high expansion turbine with an expansion ratio greater than or equal to 2.5 and less than or equal to six (6). The high pressure turbine 54 with the high expansion ratio lowers the static pressure at the turbine disk rim cavity 105. The pressure of the turbine disk rim cavity 115 is substantially less than the stagnation pressure at the leading edge 88 of the rotor blade. Therefore, a lower pressure bleed air 112 can be utilized to create a positive outflow at the turbine disk rim cavity 105. However, the lower pressure bleed air 112 would be insufficient to positively outflow the leading edge cooling holes 98 along the leading edge internal cooling passage 96.

The lower pressure needed to positively outflow the turbine disk rim cavity 105 is achieved with the lower pressure of the intermediate stage in the high pressure compressor 52. However, the leading edge cooling holes 98 require a higher pressure than the bleed air 112 from the intermediate stage of the compressor section 24 can provide. Therefore, the pressure of the bleed air 112 must increase to positively outflow the leading edge cooling holes 98.

The pressure of the bleed air 112 reaching the leading edge cooling holes 98 is increased in one non-limiting embodiment by a compression portion, such as a compressor wheel 108, attached to the rotor disk 66. In one non-limiting embodiment, the compressor wheel 108 forms a complete ring around the engine axis A. In another non-limiting embodiment, the compressor wheel 108 forms a segmented ring around the engine axis A.

The bleed air 112 is fed into a compression passage 114 at an inlet 110 on the compressor wheel 108 with a tangent on board injector (TOBI) 106 radially aligned with the inlet 110. The inlet 110 to the compression passage 114 includes a first radial position cross-sectional area at the inlet 110 that reduces to a second radial position cross-sectional area at an outlet 116 to provide additional compression to the bleed air 112.

The outlet 116 of the compression passage 114 is fluidly connected to an inlet 118 of the leading edge internal cooling passage 96 with a jumper tube 120 that is accepted within both the outlet 116 of the compression passage 114 and the inlet 118 of the leading edge internal cooling passage 96. The jumper tube 120 allows for the compressor wheel 108 to be a separate component from the rotor blade 64 and to accommodate relative movement between the rotor blade 64 and the compressor wheel 108. Additionally, the jumper tube 120 allows the compressor wheel 108 to be made from a dissimilar material from the rotor blade 64.

In the illustrated embodiment, the inlet 118 to the leading edge internal cooling passage 96 is directed in a direction having a major component in a radial direction. The inlet 118 is spaced axially forward of the rotor disk 66 and is located radially inward of radially outermost portion of the rotor disk 66. The leading edge internal cooling passage 96 extends radially outward and axially downstream from the inlet 118 through the root portion 70 of the rotor blade 64 to reach the leading edge cooling holes 102 along the leading edge 88 of the rotor blade 64.

The rotor disk 66 and the trailing edge internal cooling passage 100 are also cooled by the bleed air 112. In the illustrated non-limiting embodiment, the bleed air 112 travels through a passage 113 at least partially defined by an axially forward surface of the rotor disk 66 that is spaced from an axially downstream surface of the compressor wheel 108. From the passage 113, the bleed air 112 travels through a disk slot 104 to an inlet 122 to the trailing edge internal cooling passage 100.

In the illustrated non-limiting embodiment, the compressor wheel 108 is spaced from the rotor disk 66 in order to improve the cooling of the rotor disk such that the compressor wheel 108 does not prevent the bleed air 112 from cooling of the rotor disk 66. A disk plate 124 is located on an axially downstream side of the rotor disk 66 in order to direct the bleed air 112 through the disk slot 104 into the inlet 122 of the trailing edge internal cooling passage 100.

Figure 3:
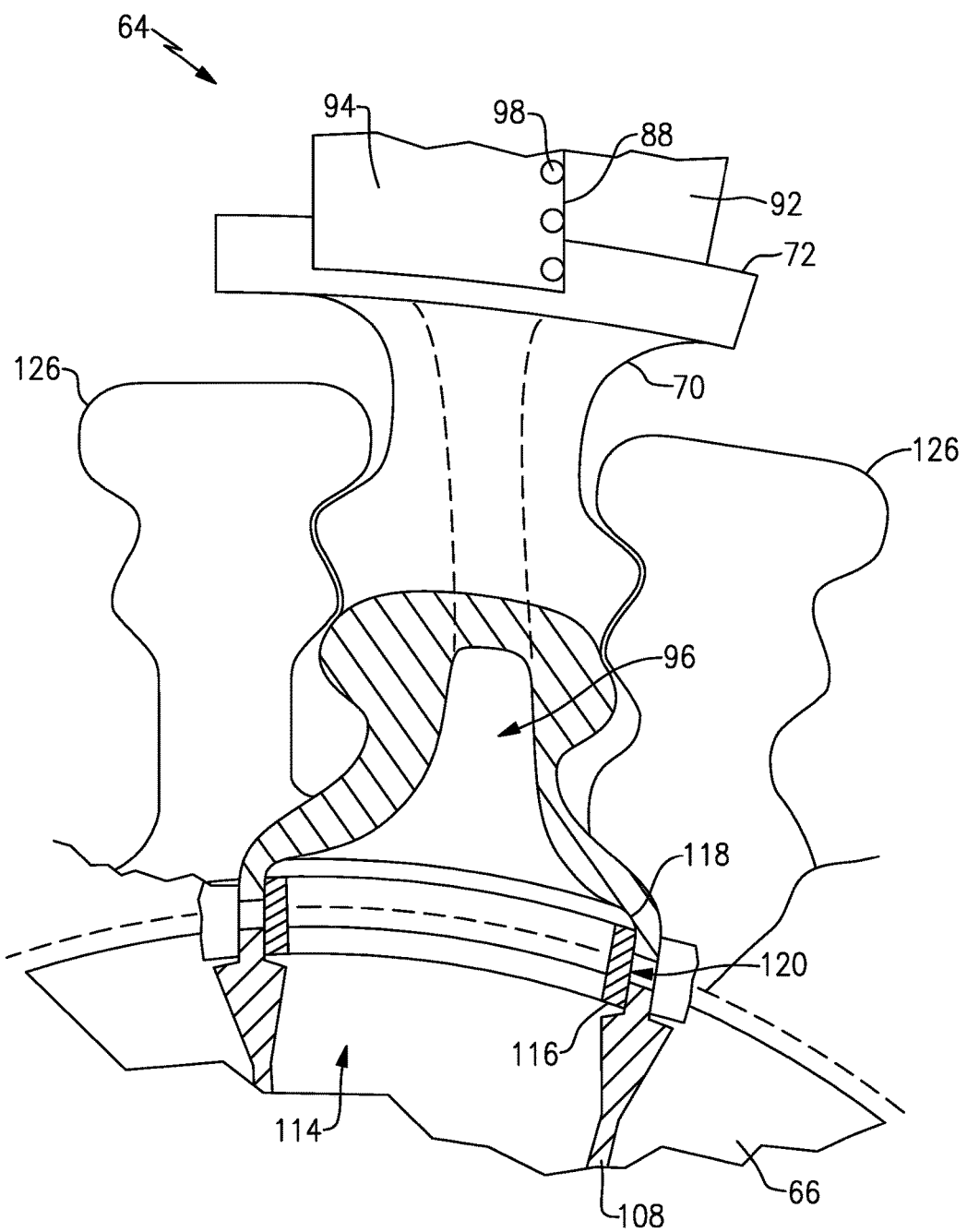
FIG. 3 is a cross-sectional view taken along line 3-3 of FIG. 2.

FIG. 3 is a cross-sectional view taken along line 3-3 of FIG. 2 illustrating the compression passage 114 and the trailing edge internal cooling passage 96. As shown in FIG. 3, the leading end internal cooling passage 96 includes a bell-mouth or aerodynamic shape that tapers radially outward from the inlet 118. The aerodynamic shape further contributes to elevating the pressure of the bleed air 112 in order to create an outlet flow through the leading edge cooling holes 98. Disk lugs 126 include contoured exterior surfaces that correspond to a contoured exterior surface of root portion 70 of the rotor blade 64 to secure the rotor blade 64 to the rotor disk 66.

Figure 4:
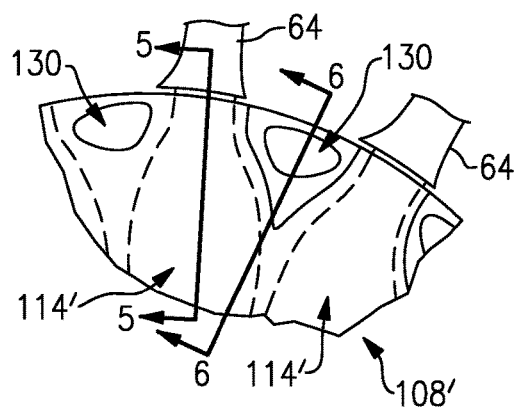
FIG. 4 illustrates a non-limiting embodiment of a compressor wheel.
Figure 5:
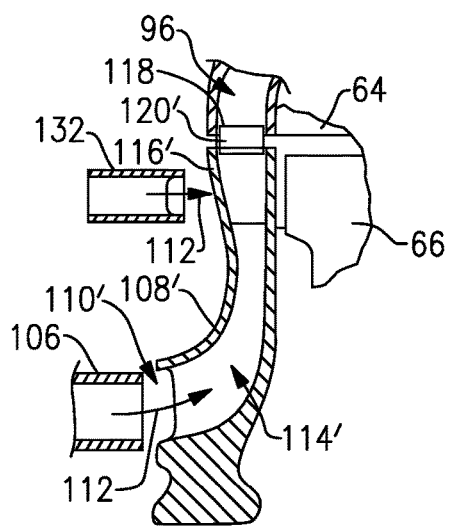
FIG. 5 illustrates a cross-sectional view taken along line 5-5 of FIG. 4.
Figure 6:
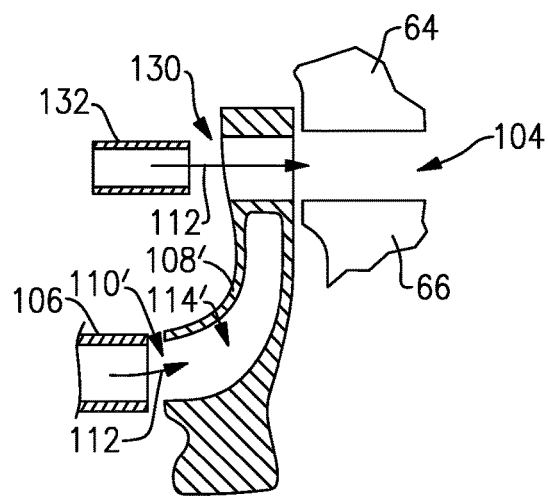
FIG. 6 illustrates a cross-sectional view taken along line 6-6 of FIG. 4.

FIGS. 4-6 illustrate a second non-limiting embodiment of a compressor portion, such as a compressor wheel 108' that is similar to the compressor wheel 108, shown in FIGS. 2-3 except as otherwise described below or shown in the Figures. The compressor wheel 108' includes both a plurality of compression passages 114' and a plurality of rotor disk passages 130. An outlet 116' of the compressor wheel 108' is connected to the inlet 118 of the leading edge internal cooling passage 96 with a jumper tube 120'.

An inlet 110' to the compression passage 114' is aligned with the first TOBI 106 and the rotor disk passage 130 is radially aligned with a second TOBI 132. Although only a single first TOBI 106 and second TOBI 132 are shown in FIGS. 4-6, multiple first and second TOBI 106, 132 could be located circumferentially around the axis A of the gas turbine engine 20.

The second TOBI 132 directs the bleed air 112 from the intermediate stage in the high pressure compressor 52 into one of the plurality of rotor disk passages 130 while the compressor wheel 108' rotates with the rotor disk 66. The rotor disk passages 130 create a more direct path for the bleed air 112 to reach the disk slot 104 and the trailing edge internal cooling passage 100 from the second TOBI 132. Each of the trailing edge internal cooling passages 100 can receive the bleed air 112 from one of the second TOBI 132 through the rotor disk passage 130 and/or from bleed air 112 traveling between the compressor wheel 108' and the rotor disk 66.

Figure 7:
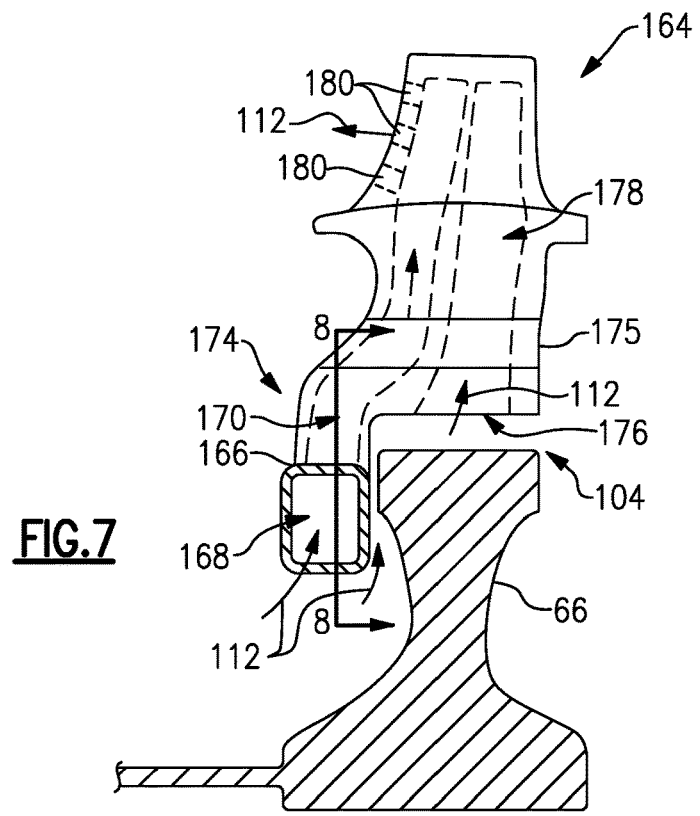
FIG. 7 illustrates a rotor blade according to a non-limiting embodiment.
Figure 8:
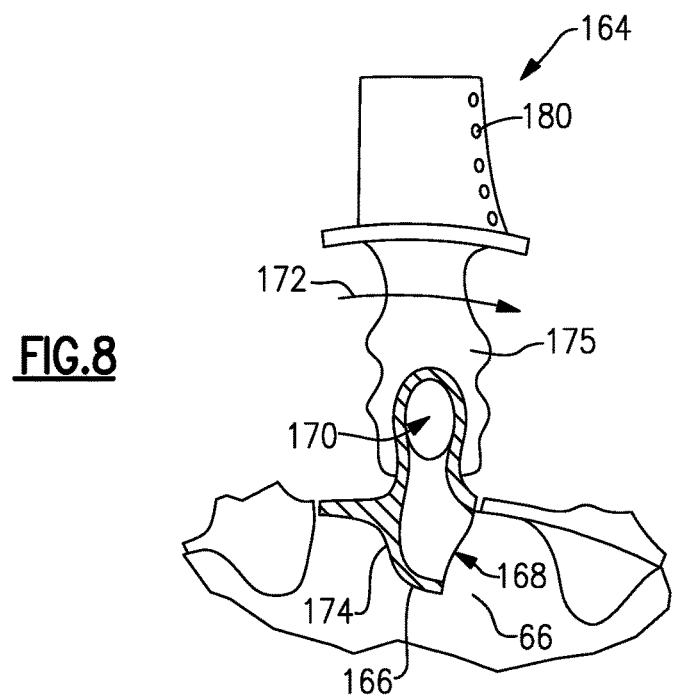
FIG. 8 illustrates a cross-sectional view taken along line 8-8 of FIG. 7.
Figure 9:
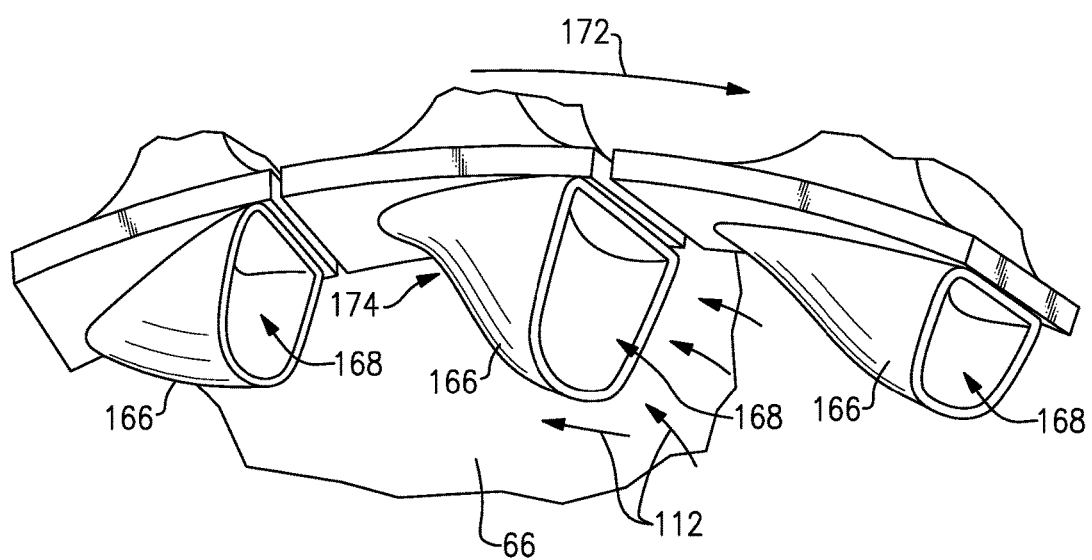
FIG. 9 illustrates a perspective view of the rotor blade of FIG. 7.

FIG. 7-9 illustrate a non-limiting embodiment of a rotor blade 164 attached to the rotor disk 66. The rotor blade 164 is similar to the rotor blade 64 shown in FIGS. 2-3 except as otherwise described below or shown in the Figures. In particular, features from the compressor wheel 108 are integrated into the rotor blade 164 to form a single unitary component.

In order to facilitate the pumping function of the compressor wheel 108 described above, the rotor blade 164 includes a compression portion, such as a scoop 166, having an inlet 168 in communication with the leading edge internal cooling passage 170. In the illustrated embodiment, the inlet 168 on the scoop 166 is also an inlet to the leading edge internal cooling passage 170. As shown in FIGS. 8 and 9, the inlet 168 to the scoop 166 includes a major component pointed in the direction of rotation of the rotor disk 66. The inlet 168 to the scoop 166 also includes a component pointing in a radially inward direction.

The scoop 166 is at a distal end of a neck portion 174 that extends from a root portion 175 of the rotor blade 164. The neck portion 174 is spaced from the rotor disk 66 to allow the bleed air 112 to pass between the neck portion 174 and the rotor disk 66 to reach an inlet 176 to a trailing edge internal cooling passage 178 adjacent the disk slot 104.

As the rotor blade 164 rotates in the direction of rotation 172, the bleed air 112 from the intermediate pressure stage of the high pressure compressor 52, is forced into the inlet 168 of the scoop 166. As the bleed air 112 passes through the inlet 168 and into the leading edge internal cooling passage 170, the pressure of the bleed air 112 increases due to the increasing radial position of the leading edge internal cooling passage 170 and the rotational movement of the rotor blade 164 forcing the bleed air 112 into the inlet 168 on the scoop 166. The elevated pressure of the bleed air 112 created by the scoop 166 and rotation of the rotor blade 164 will create a positive outflow through leading edge cooling holes 180.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A rotor blade assembly comprising:
   at least one rotor blade including an airfoil having a leading edge internal cooling passage extending through the rotor blade in communication with cooling holes along a leading edge of the airfoil;
   a compression portion including a compression passage in communication with the leading edge internal cooling passage; and
   a trailing edge internal cooling passage in fluid communication with a passage at least partially defined by an axially forward surface of a rotor disk that is spaced from an axially downstream surface of the compression portion.

2. The rotor blade assembly of claim 1, wherein the compression passage includes an inlet having a first cross-sectional area and an outlet having a second cross-sectional area smaller than the first cross sectional area.

3. The rotor blade assembly of claim 1, wherein the leading edge internal cooling passage includes an aerodynamic shape and the aerodynamic shape tapers in a radially outward direction.

4. The rotor blade assembly of claim 1, wherein the compression portion includes a compressor wheel forming a ring.

5. The rotor blade assembly of claim 1, wherein the compression portion is integral with the at least one rotor blade and includes a scoop.

6. The rotor blade assembly of claim 1, wherein the leading edge internal cooling passage is configured to receive cooling air from an intermediate stage of a compressor section to provide bleed air to the leading edge internal cooling passage.

7. The rotor blade assembly of claim 1, wherein the trailing edge internal cooling passage is fluidly isolated from the compression portion.

8. The rotor blade assembly of claim 1, wherein the passage at least partially defined by an axially forward surface of a rotor disk is upstream of a disk slot passage and the disk slot passage extends in an axial direction is in fluid communication with an inlet to the trailing edge internal cooling passage.

9. A gas turbine engine assembly comprising:
   a compressor section for providing a bleed air source;
   a rotor blade assembly including:
     at least one rotor blade including an airfoil having a leading edge internal cooling passage extending through the rotor blade in communication with cooling holes along a leading edge of the airfoil;
     a compression portion including a compression passage in communication with the leading edge internal cooling passage and the bleed air source; and
     a trailing edge internal cooling passage in fluid communication with a passage at least partially defined by an axially forward surface of a rotor disk that is spaced from an axially downstream surface of the compression portion.

10. The gas turbine engine of claim 9, wherein the bleed air source is from an intermediate stage of the compressor section.

11. The gas turbine engine of claim 10, wherein the compressor section includes a high pressure compressor and the intermediate stage is located in the high pressure compressor.

12. The gas turbine engine of claim 9, wherein the compression passage includes an inlet having a first cross-sectional area and an outlet having a second cross-sectional area smaller than the first cross sectional area.

13. The gas turbine engine of claim 9, wherein the leading edge internal cooling passage includes an aerodynamic shape and the aerodynamic shape tapers in a radially outward direction.

14. The gas turbine engine of claim 9, wherein the compression portion includes a compressor wheel forming a ring.

15. The gas turbine engine of claim 9, wherein the compression portion is integral with the at least one rotor blade and includes a scoop.

16. The gas turbine engine of claim 9, wherein the passage at least partially defined by an axially forward surface of a rotor disk is upstream of a disk slot passage and the disk slot passage extends in an axial direction and is in fluid communication with an inlet to the trailing edge internal cooling passage.

17. A method of cooling a rotor blade comprising
directing bleed air from a compressor section into a rotor cavity;
directing a first portion of the bleed air at a first pressure into a compression portion for increasing a pressure of the bleed air entering a leading edge internal cooling passage of at least one rotor blade to a second pressure; and
directing a second portion of the bleed air at the first pressure into a trailing edge internal cooling passage, wherein the trailing edge internal cooling passage in fluid communication with a passage at least partially defined by an axially forward surface of a rotor disk that is spaced from an axially downstream surface of the compression portion.

18. The method of claim 17, including rotating the compression portion with the at least one rotor blade.

19. The method of claim 18, including extracting the bleed air from an intermediate stage of a high pressure compressor in the compressor section.

20. The method of claim 17, wherein the first pressure is greater than the second pressure.

* * * * *